United States Patent
Reimers et al.

(10) Patent No.: US 11,260,935 B2
(45) Date of Patent: Mar. 1, 2022

(54) PEDAL POWERED MOTOR-ASSISTED RIDING GOLF BAG CART/CYCLE

(71) Applicant: Sun Mountain Sports, Inc., Missoula, MT (US)

(72) Inventors: Eric W. Reimers, Missoula, MT (US); Michael J. Deden, Missoula, MT (US); Dale H. Truett, Missoula, MT (US)

(73) Assignee: Sun Mountain Sports, Inc., Missoula, MT (US)

( * ) Notice: Subject to any disclaimer, the term of this patent is extended or adjusted under 35 U.S.C. 154(b) by 0 days.

(21) Appl. No.: 16/423,025

(22) Filed: May 26, 2019

(65) Prior Publication Data
US 2020/0377172 A1    Dec. 3, 2020

Related U.S. Application Data

(60) Provisional application No. 62/677,332, filed on May 29, 2018, provisional application No. 62/677,315, filed on May 29, 2018.

(51) Int. Cl.
| | |
|---|---|
| *B62M 6/45* | (2010.01) |
| *B62K 11/02* | (2006.01) |
| *B62M 6/70* | (2010.01) |
| *B62J 11/05* | (2020.01) |
| *B62J 1/08* | (2006.01) |
| *B62K 11/14* | (2006.01) |

(52) U.S. Cl.
CPC .............. *B62M 6/45* (2013.01); *B62J 1/08* (2013.01); *B62J 11/05* (2020.02); *B62K 11/02* (2013.01); *B62K 11/14* (2013.01); *B62M 6/70* (2013.01)

(58) Field of Classification Search
CPC . B62M 6/45; B62M 6/70; B62M 6/65; B62K 11/02; B62K 11/14; B62K 15/00; B62K 21/12; B62J 11/05; B62J 1/08
See application file for complete search history.

(56) References Cited

U.S. PATENT DOCUMENTS

| | | | | | |
|---|---|---|---|---|---|
| 3,247,923 | A | * | 4/1966 | Cornell | B62B 5/0026 180/19.1 |
| 3,605,929 | A | * | 9/1971 | Rolland | B62D 61/08 180/208 |
| 5,265,695 | A | * | 11/1993 | Piazzi | B62K 3/002 180/208 |
| 5,277,267 | A | * | 1/1994 | Tiffany | B62K 5/027 180/208 |
| 5,328,193 | A | * | 7/1994 | Shiew | B62K 3/002 280/62 |

(Continued)

*Primary Examiner* — Tony H Winner
*Assistant Examiner* — Marlon A Arce
(74) *Attorney, Agent, or Firm* — Dawsey Co., LPA; David J. Dawsey

(57) ABSTRACT

A pedal powered motor-assist golf bag cart/cycle (10) is a personal riding golf cart/cycle adapted to transport a rider and a golf bag (12) for use on a golf course. The cart/cycle (10) is generally symmetrical about a longitudinal plane (11) and includes a frame (14) with a seat (16), a front wheel and steering components (18), a rear wheel (20), an inclined bag support (22), a pedal subassembly (24), a motor assist subassembly (26), and controls (28). It is adapted to be propelled by either the pedal subassembly (24), the motor subassembly (26), or both together.

20 Claims, 8 Drawing Sheets

(56) References Cited

U.S. PATENT DOCUMENTS

| | | | | |
|---|---|---|---|---|
| 5,697,464 | A * | 12/1997 | Gojak | B62D 31/006 |
| | | | | 180/208 |
| 6,659,208 | B2 * | 12/2003 | Gaffney | B62D 51/04 |
| | | | | 180/19.2 |
| 7,631,715 | B2 * | 12/2009 | Falkiner | B62K 5/027 |
| | | | | 180/215 |
| 8,490,732 | B2 * | 7/2013 | Sugimoto | B62M 6/90 |
| | | | | 180/206.1 |
| 9,550,540 | B1 * | 1/2017 | Wang | B62K 15/006 |
| 10,016,666 | B2 * | 7/2018 | Reimers | B62K 15/008 |
| 10,179,624 | B1 * | 1/2019 | O'Donnell | B62J 23/00 |
| 10,189,529 | B1 * | 1/2019 | Wang | B62K 5/05 |
| 2008/0023236 | A1 * | 1/2008 | Falkiner | A63B 55/61 |
| | | | | 180/65.1 |
| 2010/0206652 | A1 * | 8/2010 | Kielland | B62M 6/55 |
| | | | | 180/220 |

* cited by examiner

PEDAL POWERED MOTOR-ASSISTED RIDING GOLF BAG CART/CYCLE

This is a non-provisional application, claiming priority from U.S. provisional applications Nos. 62/677,332 and 62/677,315 by the same inventors, filed 29 May 2018.

TECHNICAL FIELD

The present invention relates generally to accessories for golfers and particularly to personal power-assisted golf bag carts and methods for transporting golf bags and the golfer.

BACKGROUND ART

Although the purists in the golf community insist that the only way to properly play golf is to carry the golf bag, either personally or through the use of a caddy, many golfers prefer to use carts to transport the golf bags and associated equipment. While riding carts are required by many courses, a great number of players desire to gain at least some of the exercise benefits of more compact and efficient means of transporting themselves and their equipment during the round while avoiding the often higher costs of renting a multiplayer cart from the course. For this reason walking carts are popular, but a riding personal cart would be even better for those who wish to limit their exertions.

For many years pull carts, usually two-wheeled, were the norm. However, powered options, such as electric bag carts are fairly popular and gyroscopic two wheeled units with room for a rider and bag have been introduced.

Nonetheless, demand continues for more compact, more stable, more convenient, and lighter golf bag carts, particularly personal riding powered carts.

DISCLOSURE OF INVENTION

Accordingly, it is an object of the present invention to provide a pedal-powered, with motor assist, riding golf bag cycle for transporting a golf bag and rider in a highly stable manner.

Another object of the invention is to provide a riding personal golf cart/cycle which does not cause meaningful damage to fairways, rough, and other "through the green" areas of golf courses.

A further object of the present invention is to provide a riding cart system with convenient support of the golf bag between the legs of the rider.

Yet another object of the invention is to provide a riding powered cart which has a minimal footprint.

Another object of the invention is to provide a riding pedal-powered golf cart which is steerable by the rider and has sufficient power assist available to negotiate typical golf course terrain.

A further object of the present invention is to provide a single passenger riding golf bag cart which partially collapses to a storage mode for transport of storage.

Briefly, one preferred embodiment of the present invention is a personal riding golf cart/cycle adapted to transport a rider and a golf bag. The cart/cycle has the general shape of a two wheeled cycle. The cart/cycle is generally symmetrical about a longitudinal plane and includes a plurality of compatible subassemblies, each providing important functions to the whole. The subassemblies (each also designated as an "sba") include: a cycle frame subassembly; a personal support subassembly; a front wheel/steering subassembly; a rear wheel subassembly; a bag support subassembly; a pedal subassembly, a motor-assist subassembly and a control subassembly. The user rides, steers, and controls the speed from a height-adjustable seat above approximately the front of the rear wheel and above the pedals and the golf bag. The golf bag and its contents golf bag are supported at an angle between the golfer's legs, which extend downward to pedals on either side of the frame. An electrical power-assist motor situated in the rear wheel hub is powered by a battery mounted on the frame and is controlled by control elements mounted on the steering unit. Portions of the personal, bag support, and steering subassemblies are collapsible for convenient transport and storage.

An advantage of the present invention is that it provides a simple, relatively lightweight, and comfortable single user powered riding golf cart which functions like a pedal-powered bicycle in many conditions but has a motor assist for climbing hills and negotiating difficult terrain.

Another advantage of the invention is that it is bilaterally symmetrical and relatively thin such that multiple units may be parked in a smaller space than conventional riding carts.

A further advantage of the invention is that a single passenger cart significantly improves the speed of playing a round, since it is not necessary to deal with two balls in play in widespread separations.

Yet another advantage of the present invention is that the cycle structure provides a familiar and comfortable means of transport for the golfer and equipment around the golf course.

Still another advantage of the present invention is that its wide tires minimize potential damage to turf and thus may be considered by many courses to be usable on the fairways and rough (grass covered portions) of the course, rather than restricted to cart paths, thus drastically aiding the comfort of the golfer and reducing the time taken to play a round of golf.

Another advantage of the present invention is that embodiments having partially collapsible aspects make it convenient for transport between home and also at the golf course and locations, rather than exclusively for storage at the course, although the preferred embodiment is adapted to transport on common bike-carriers.

A still further advantage of the present riding golf bag cart/cycle invention is that no straps or similar restraints are usually necessary to keep the golf bag in place and provide easy access to the clubs during use, although such straps or similar restraints may be provided for some embodiments.

Yet another advantage of the present invention is that the open frame of the bag support subassembly permits easy access to the pockets of the golf bag, so that the golfer may store and retrieve golf balls and accessories.

Another advantage of the present invention is that it provides the "feel" and locational convenience of a walking round, with significantly less stress or wear and tear on the golfer's body.

Still another advantage of the present invention is that it may be operated using only pedal power, using only motor power, or both together, depending on the terrain and the desires of the rider.

An additional advantage of the present invention is that the limited power of the motor component facilitates the use of the cart/cycle on streets so that the rider can use it for transport other than n a golf course.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended

BEST MODE FOR CARRYING OUT THE INVENTION

Figure 6:
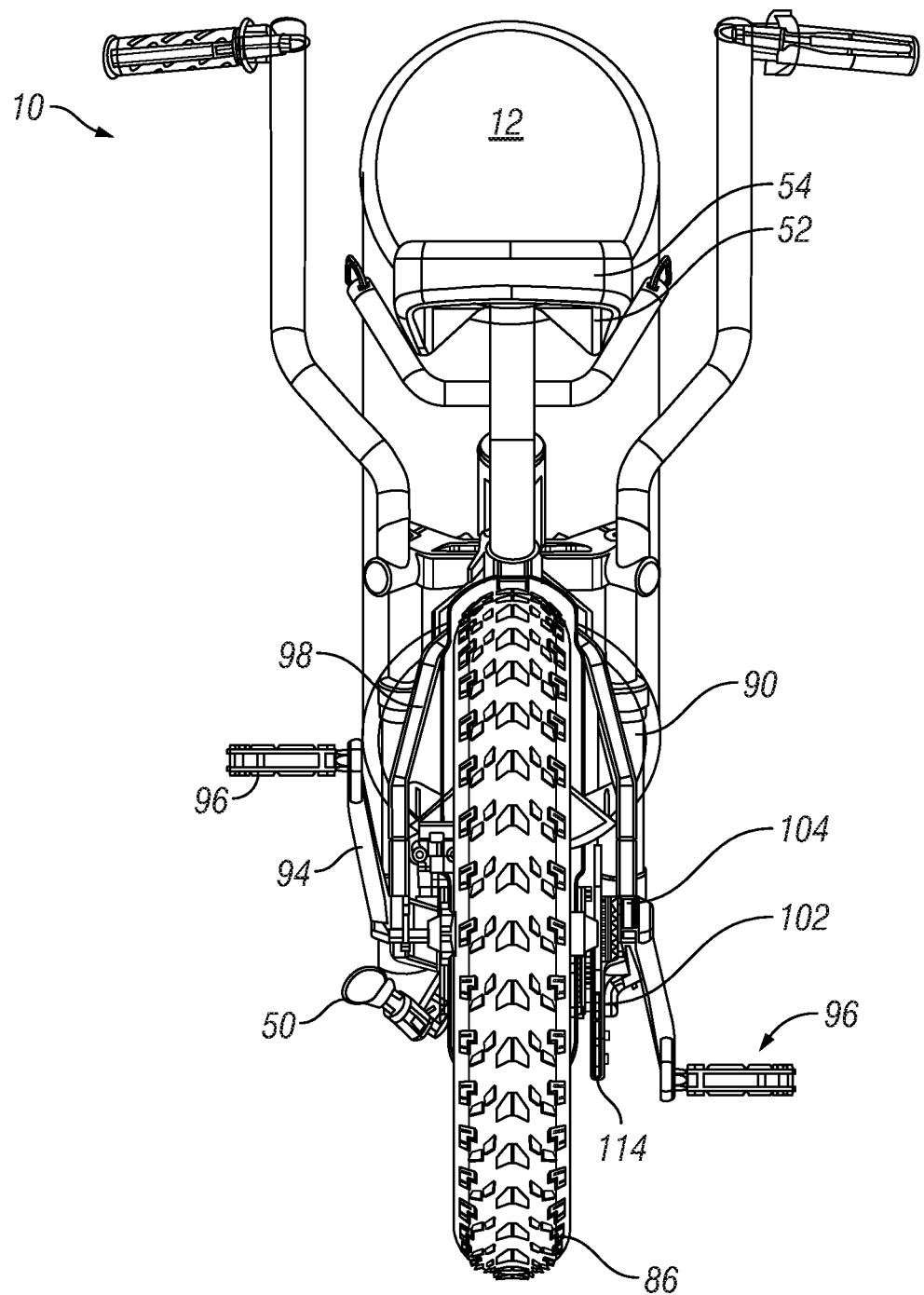
FIG. 6 is a rear elevational view of the rideable golf bag cart/cycle of the present invention, showing a rider in phantom.
Figure 7:
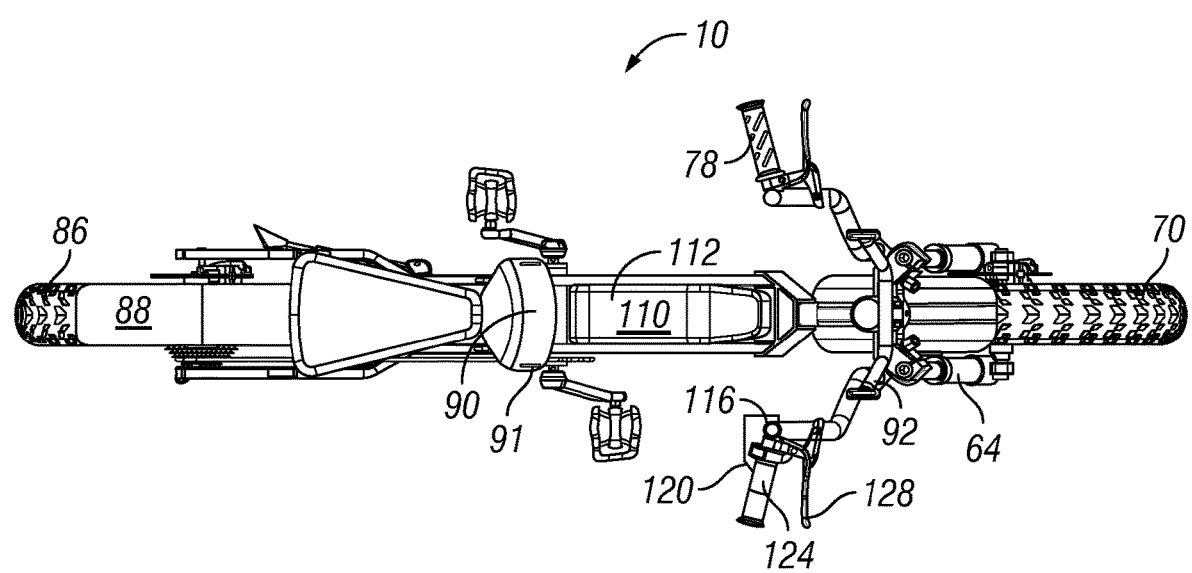
FIG. 7 is a top view of the preferred embodiment.
Figure 8:
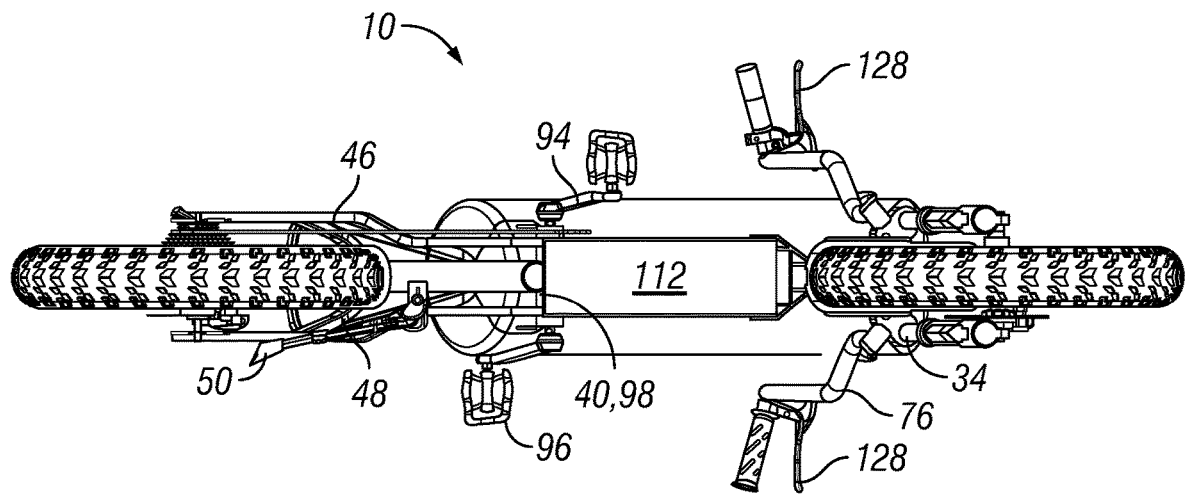
FIG. 8 is a bottom view.

The present invention is personal riding golf bag cart in the form of a riding cycle used to transport the user along with golf bags loaded with golf clubs and accessories. The pedal-powered riding golf bag cart/cycle is referred to by the general reference character 10, generally referred to as "riding cart 10", in the description. The riding cart 10 is generally symmetrical about a vertical (in normal operation) longitudinal plane 11. The riding cart 10 may be used with various golf bags 12 and may exist in multiple embodiments. The pedal-power is directly provided by the golfer/rider 13 (shown in phantom in FIG. 6) and is adapted to be assisted by a motor, as discussed below.

Figure 1:
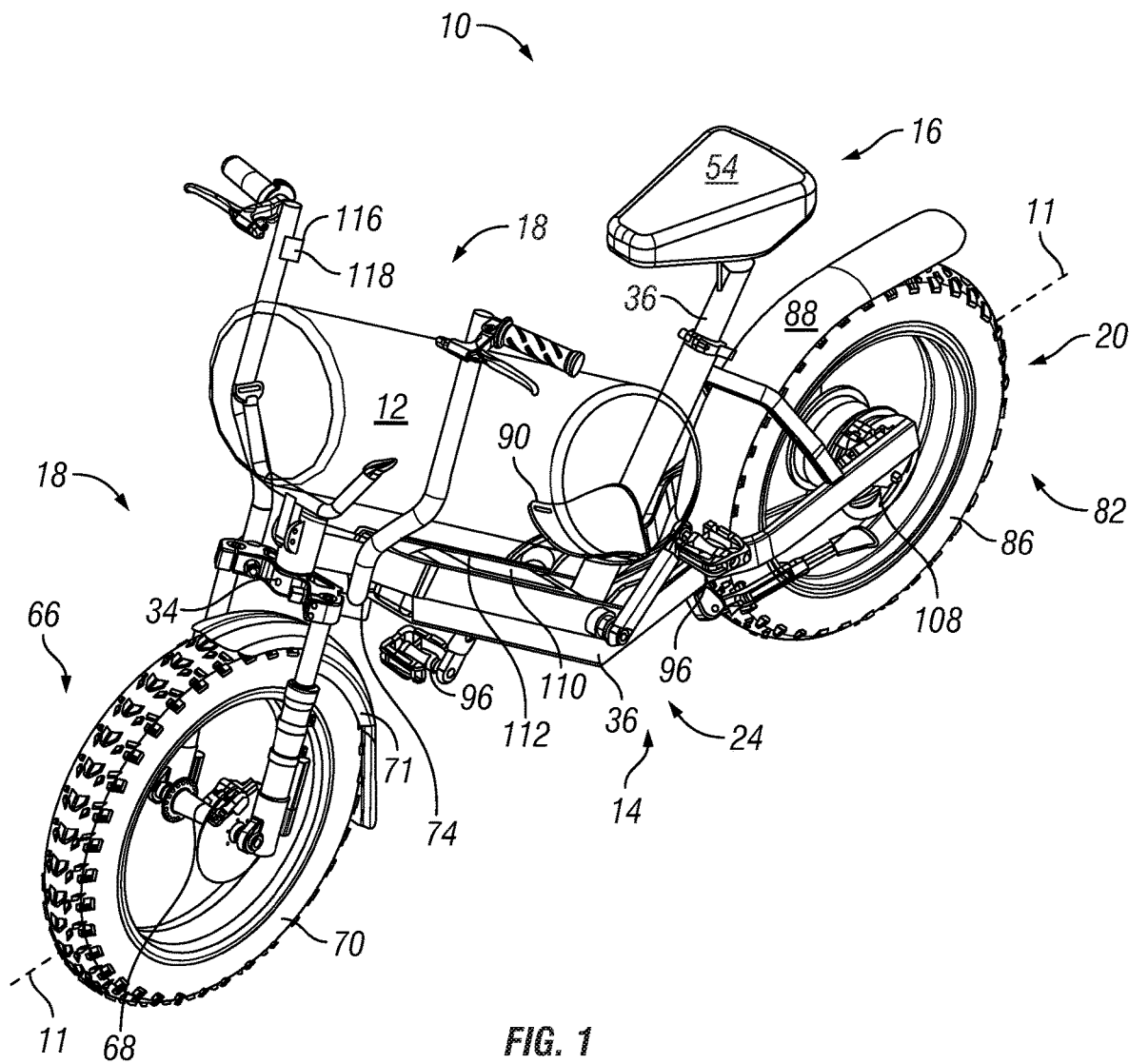
FIG. 1 is a front right elevational view of the riding cycle golf bag cart of the present invention, illustrating (in phantom) a golf bag carried thereon.
Figure 2:
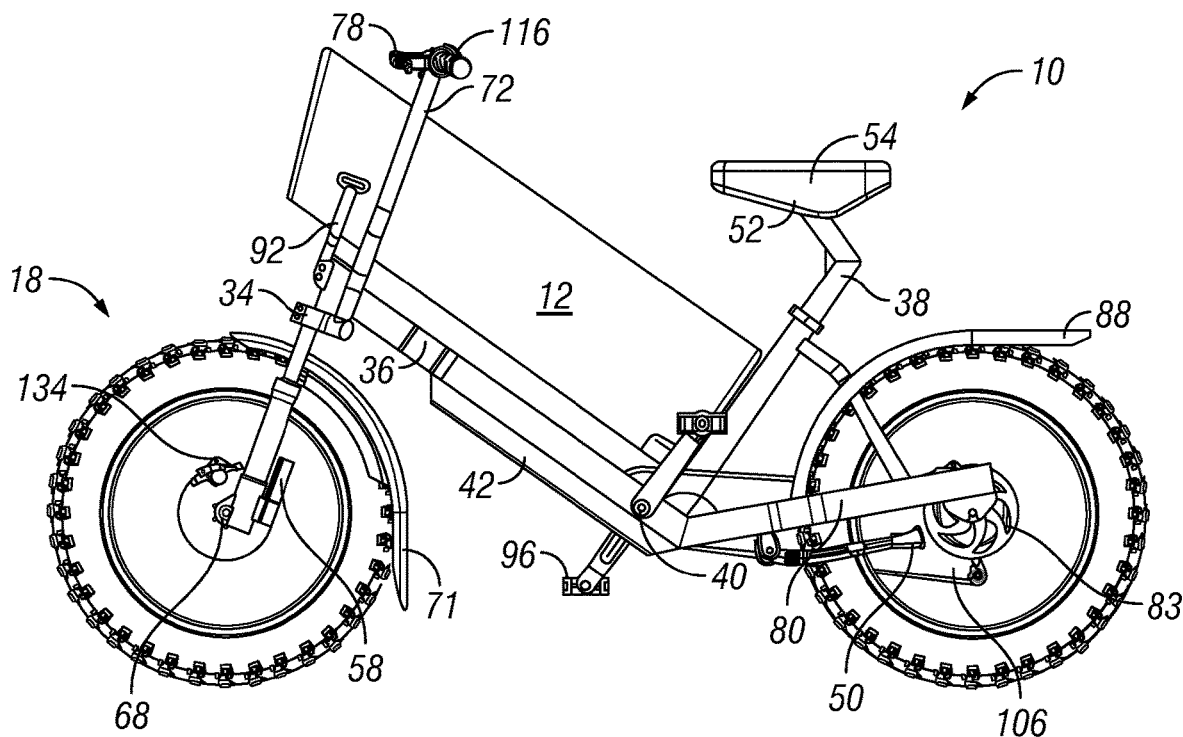
FIG. 2. is a left elevational view of the riding cycle golf bag cart of the present invention.
Figure 3:
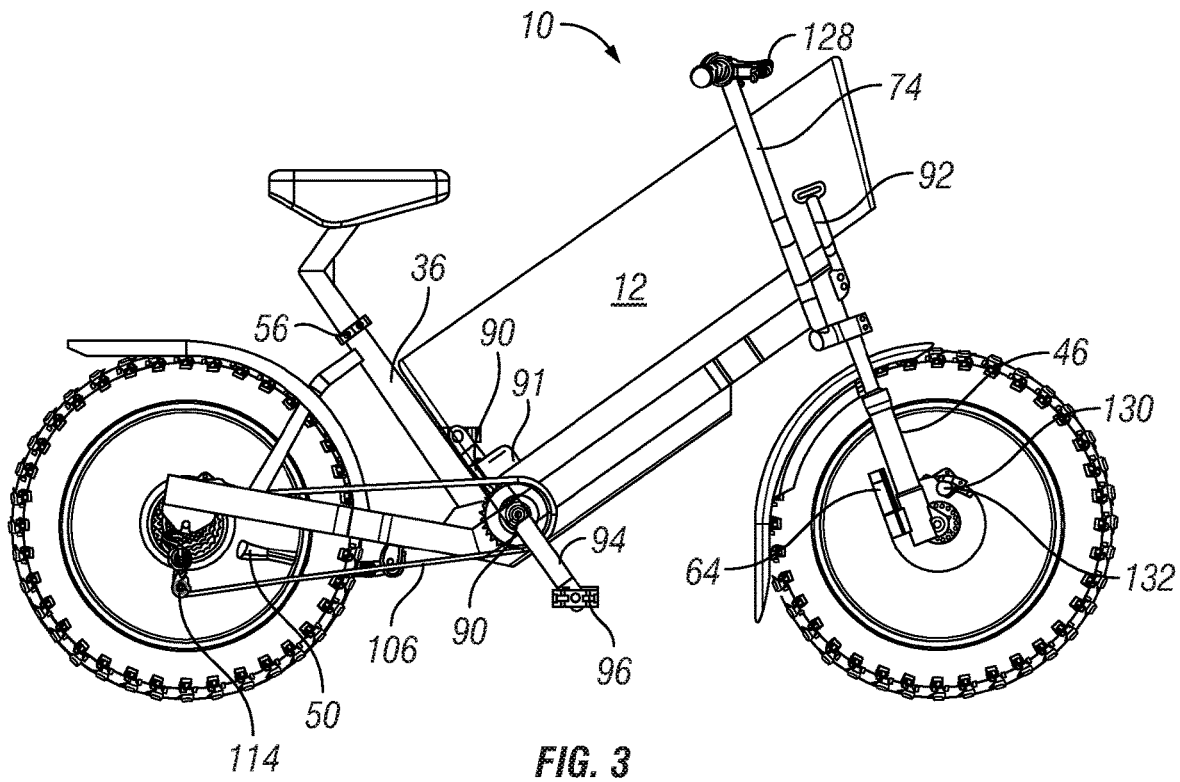
FIG. 3 is a right side elevational view of the present invention.
Figure 4:
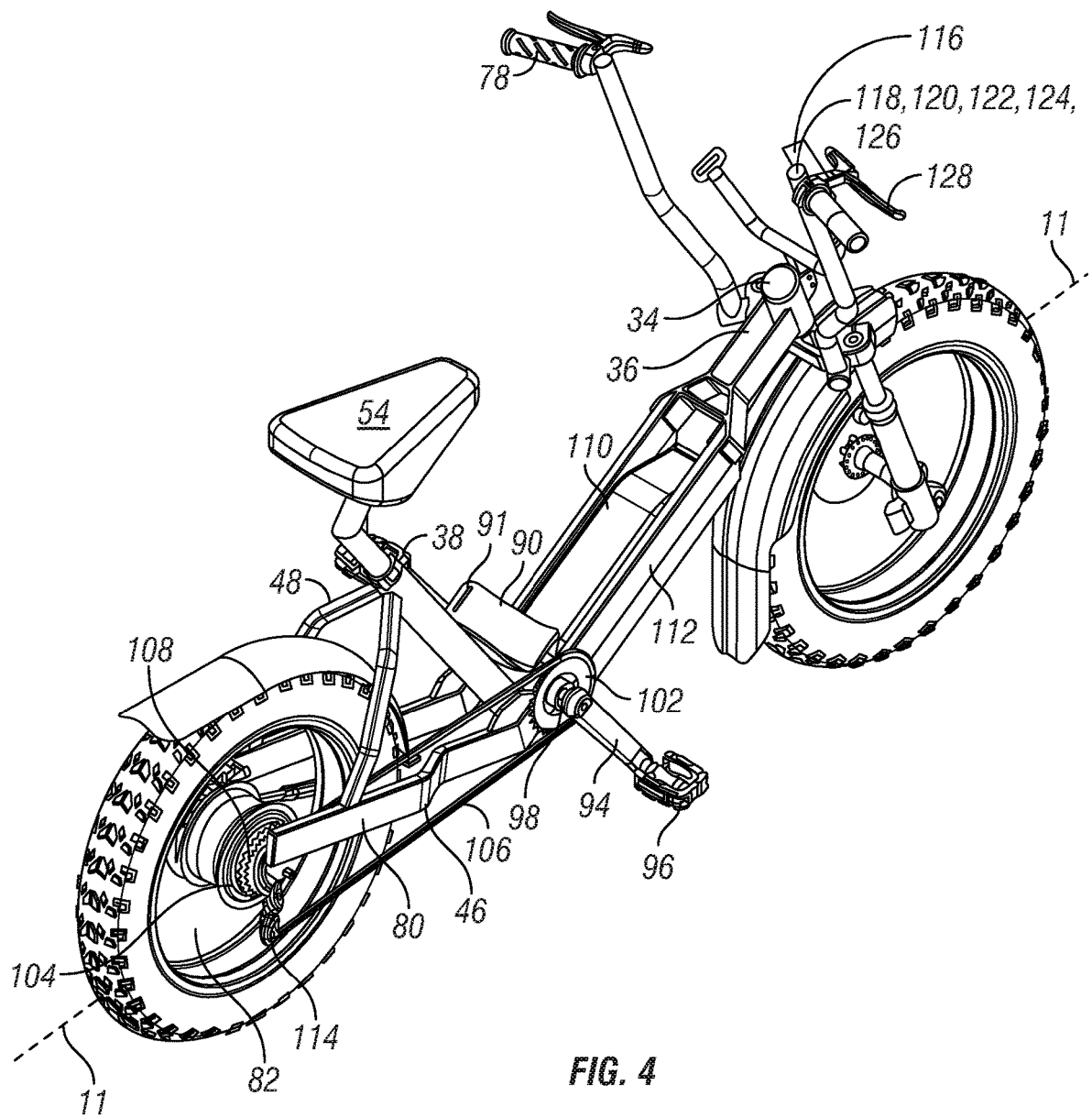
FIG. 4 a rear right side perspective view of the presently preferred embodiment of the invention.
Figure 5:
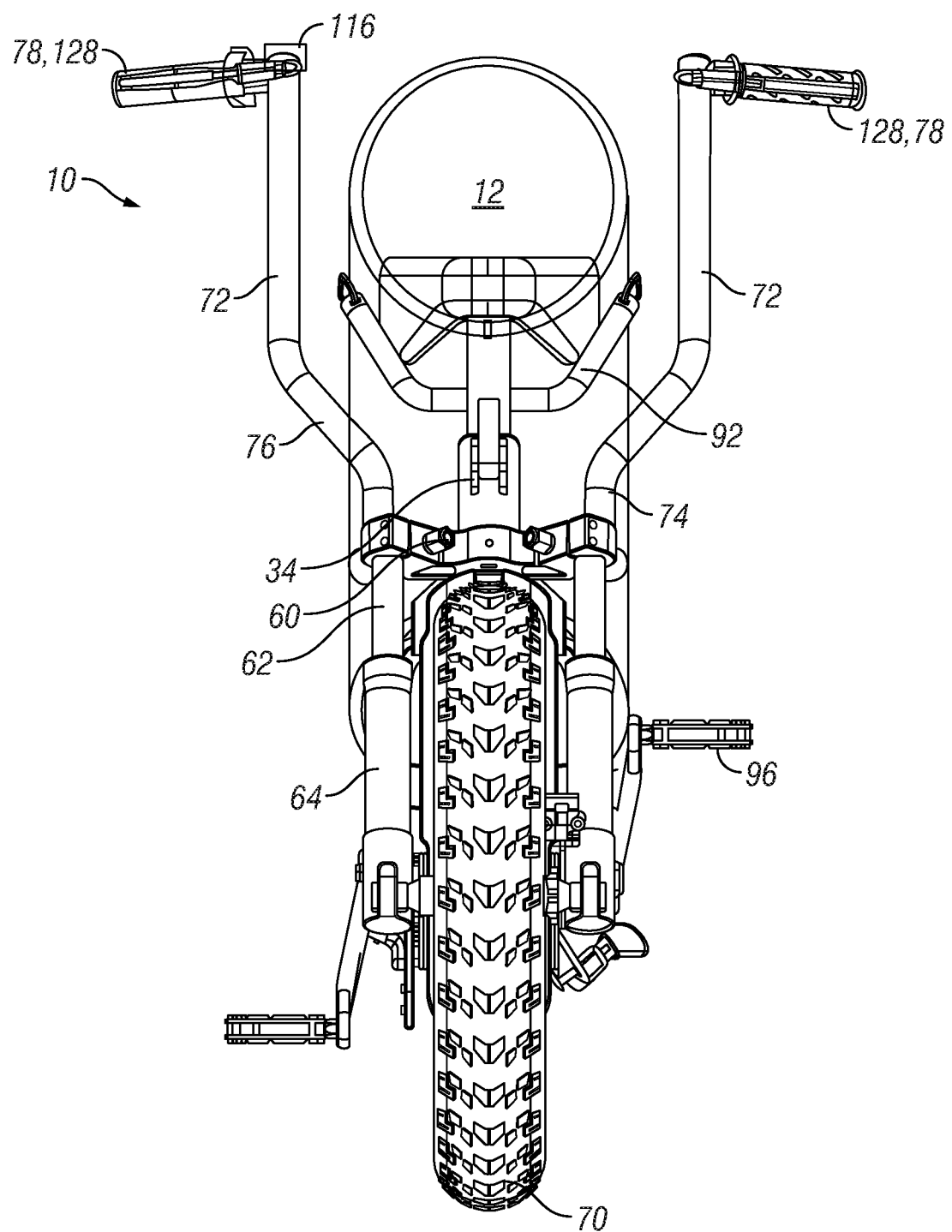
FIG. 5. is a front elevational view of the invention.

In one preferred embodiment of the invention illustrated in FIGS. 1 and 4, the riding cart 10 is shown in a perspective view as appropriate for transporting the typical golf bag 12 as well as a golfer/rider 13 (not shown). Although oversized "power-cart" golf bags are generally too large in diameter for comfortable riding between the rider's legs (and may interfere with pedaling and moving components) most conventional golf carry bags and slim-line cart bags are workable and comfortable.

The riding cart 10 may be thought of as having various principal assembles or subassemblies (each sometimes referred to in shorthand as a "sba" herein) which operate together in order to function as an easy to use method of transporting a golf bag on the rolling surfaces of a golf course and in other locations such as parking lots and storage facilities. The primary subassemblies include: a frame subassembly (sba) 14; a personal support sba 16; a front wheel and steering sba 18, a rear wheel sba 20, a bag support sba 22, a pedal sba 24, a motor-assist sba 26, and a motive control sba 28. It is understood that some components of the invention interface with others and may be considered to be a part of more than one of the subassemblies. As discussed further below, some of the sbas in alternate embodiments may have structures and features which allow them to be physically manipulated to create a collapsed/storage mode 30 having a lower and shorter aspect for transport and storage.

As best seen in FIGS. 1-4 and 8, the frame subassembly 14 includes a convoluted frame tube structure 32, aligned within the vertical longitudinal plane 11, which mates together with a steering bracket 34 (part of the front wheel/steering sba 18) at the front of the frame 14. The frame tube 32 extends rearward along the longitudinal plane 11 from the steering bracket 34. A front angle tube 36 is affixed to the stationary steering bracket 34 and is angled downward to intersect at an approximately right angle to bond with a lower extent of a seat tube 38. A pedal support tunnel 40 extends laterally through the front angle tube 36 forward of the seat tube 38. The seat tube 38 extends below the intersection with the front angle tube 36 to support a horizontally arrayed undercarriage 42. The frame sba 14 also includes a rocker arm fork 46 pivotally extending from the angle tube 36. A brace fork 48 extends rearward and downward from the upper portion of the seat tube 38 to mate with the rocker arm 46. A kickstand 50 pivotally depends from lower portion of the angle tube 36, and may be engaged to maintain the bag cart/cycle 10 in a generally vertical orientation when unoccupied by the rider 13 and then manually disengaged when motion is desired.

The personal support sba 16 is an adjunct to the cycle frame sba 14. The personal support sba 16 includes a seat 50 having a cushion 52. The seat 50 is mounted on and above the seat tube 38 with a height adjustable mounting bracket 54 so that the rider 13 is comfortable with operating the pedal sba 24. The seat 50 provides support for the golfer/rider 13 during use. Typically, the seat 50 may be mounted by the rider 13 either from the rear or, if feasible, from either side.

The front wheel/steering subassembly 18 includes a front fork 58 pivotally mounted to depend from the steering bracket 34. The front fork 58 includes a fork bracket 60 pivotally connected to the steering bracket 34 and supports a pair of opposed fork arms 62 depending therefrom, each optionally including a shock absorber 64. The fork arms 62 support a front wheel 66 on a front axle 68 extending between the lower extent of the opposing fork arms 64. The front wheel 66 has a substantial diameter and supports a front tire 70 having a moderately wide tread for traction while being pneumatic and relatively soft so as to avoid damaging the turf in use. A front fender 71 may be mounted between the arms of the front fork 58 above the front tire 70 to minimize splashing or debris from impacting the rider 13 or the golf bag 12.

Figure 9:
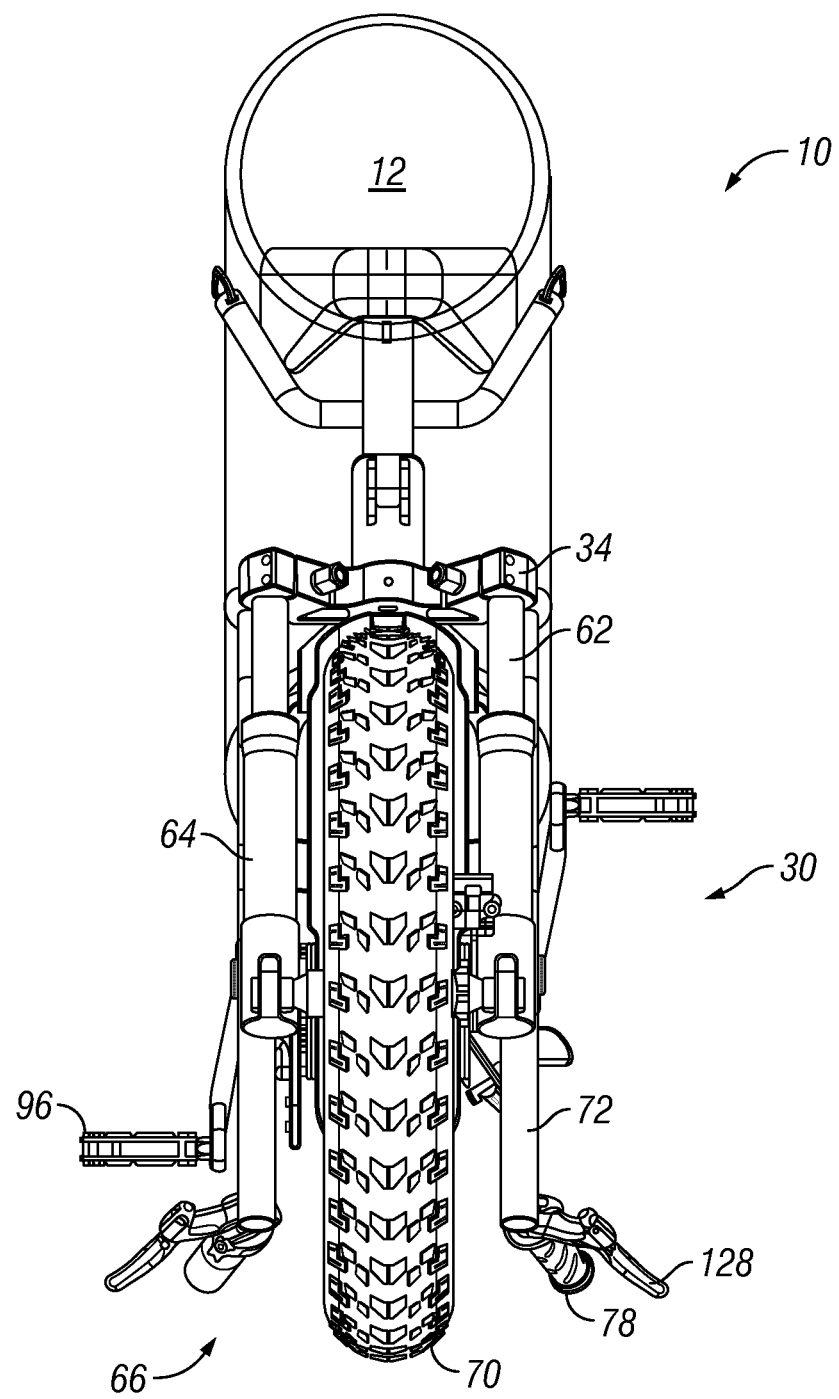
FIG. 9 is a front view, similar to FIG. 5, showing the collapsed mode of the invention.

In the preferred embodiment 10 the upper portion of the front wheel/steering sba 22 includes a set of handlebars 72 pivotally attached to the fork bracket 60 by pivot tubes 74 on either side. Each handlebar 72 is bent outwards to form a curved tube 76 pivotally extending above the respective pivot tube 74 in order to facilitate steering and turning without impacting the golf bag 12 which extends therebetween. The curved tube 76 extends upward to handle grips 78 for comfortable hand positioning and steering. The pivotal attachment of the handlebars 72 to the fork bracket 60 allows the handlebars 72 to pivot downward around the front 70 tire in the compact storage more 30 (see FIG. 9). The curved tube 76 may also be rotated on the pivot tube 74 such that the handle grips 78 are aligned to be generally parallel with the front tire 70, thus minimizing net width in the collapsed storage mode 30.

The rear wheel subassembly 24 includes the previously described rocker arm fork 46 and brace fork 48 which together function as a rear fork 80. The rear fork 80 supports a rear wheel 82 having a hub 83 surrounding a rear axle 84. The rear wheel 82 is generally dimensionally the same as the front wheel 66 and supports a rear tire 86. The rear tire 88 is wide similarly to the front tire 66 to provide good driving traction while minimizing impact on the turf of the course. The rear tire 86 may be inflatable or solid. A fender 88 may be attached to the rear fork 80 or to the seat fork segment 44 to extend over the upper portion of the rear tire 86.

The bag support sba 22 is adapted to hold the golf bag 12 in place on the cart/cycle 10. The golf bag 12 is supported at about a forty-five to sixty five degree vertical angle, twenty five to forty five degrees to the horizontal, (with the club heads extending forward through the handlebars 72 and above the front wheel 66. The base of the golf bag 12 rests upon a bag bottom cradle 90 and may abut against the seat tube 38. The bag bottom cradle 90 is shaped to have wings 91 which extend upward and outward to hold the bag bottom up and laterally in place.

An upper bag cradle 92 is mounted on the steering bracket 34 to laterally cradle the upper part of the golf bag 12 and prevent the golf bag 12 and clubs from interfering with the handle bars 72. It is noted that the upper bag cradle 92 is stationary on the stationary steering bracket 34 and does not rotate with the handlebars 72. This arrangement maintains the golf bag 12 in position to be always centered on the longitudinal plane 11 even when the cart/cycle 10 is being steered around curves (the handlebars 72 being spread wide enough that the curved tubes 76 do not contact the golf bag 12 in any but the most extreme turns).

The pedal subassembly 24 facilitates operating the cart/cycle 10 either by itself or in combination with the motor assist sba 26. The components of pedal subassembly are all situated in the vicinity of the pedal support tunnel 42 discussed above. A pair of vertically opposed pedal arms 94, each including a rotatable pedal 96, are rigidly connected by a pedal axle 98 passing through the pedal support tunnel 40, cause a sprocket 100 to rotate when the rider 13 rotates the pedal sba 24 (in a similar manner to that of operating a conventional bicycle). When the cart/cycle 10 is operating in a pedal-only mode, it operates in the same manner as a conventional bicycle.

The sprocket 100 in the preferred embodiment is a toothed disk 102 which drives a similar (if smaller) rear disk 104, connected to the rear wheel axle 84, by virtue of a drive chain 106, Other drive concepts may also work, such as a belt drive, but the sprocket and chain mechanism is more reliable for pedal power. It is noted that the pedal power works only to propel the cart/cycle 10 forward and is not usable for reverse motion.

The motor assist sba 26 provides the power to move the cart/cycle 10 and the golfer 13 around the course, either providing sole power of operating to assist the pedal sba 24. The presently preferred embodiment 10 is a rear wheel drive system with an electrical motor 108 and a rechargeable battery 110. The electrical motor 108 in the present embodiment is a disc motor situated in the hub 83. Other motive systems may drive the rear wheel by any of a variety of mechanisms, including a chain drive, or a belt drive. The battery 110 may be mounted at various locations on the cycle frame 14, with the preferred version being a battery cradle 112 nested within the undercarriage 42.

The electrical motor 108 is intentionally limited in power in order to be "street legal" in most jurisdictions. This allows the cart/cycle 10 to be ridden to and from the course or on other errands unrelated to golf. Even in motor-assist or motor only modes.

In a motor assist mode, the motor 108 provides additional motive power to the rear wheel 82 to assist the force being provided by the rider 13 using the pedals 96. In this mode the electrical drive provides additional rotational energy which helps the rider 13 in situations where pedaling is difficult, such as when climbing hills of working in difficult terrain. In this mode the motor 108 does not supplant the pedal drive sba 24 but merely helps out.

The cart/cycle 10 can also be operated solely on motor power when the rider 13 wishes to rest. To facilitate this, a decoupler 114 is provided to decouple the pedal sba 24 from the rear axle 84 such that the pedals 96 are not forced to rotate during a motor-alone mode operation. This mode is ordinarily used on relatively flat terrain in the preferred embodiment since it is not intended, for overall weight and cost considerations, that the preferred motor 108 is powerful enough to handle steep inclines with a normal or heavy rider 13 aboard.

The operational mode and speed of the motor 108 will typically be regulated by the golfer 13 by a control unit 116 usually mounted on one of the handlebars 72, normally adjacent to or part of the handle grips 76. The control unit 116 has settings which allow the motor 108 to be set to off 118, motor-assist 120, and motor only 122 (which also engages the decoupler 114). A throttle control 124 allows the rider 13 to select the speed/rotational force in motor-assist and motor only modes. An optional speedometer 126 may also be provided to allow the rider to know the velocity of travel.

A brake actuator 128, also typically situated near a handle grip 74, will control a brake 130 applied to one or both of the front wheel 66 and/or the rear wheel 82. The front brake 132 will typically be a conventional friction brake while a rear brake 134 may be a motor brake, a disc brake, or a friction brake.

The preferred embodiment 10 is primarily constructed of cast or extruded anodized aluminum for light weight and durability. The wheels 66 and 82 are pneumatic tires with cushioned traction surfaces and may either be provided with solid hubs or spoke hubs (although the rear wheel will have a hub for containing the electric motor 108).

In one embodiment (see FIG. 9) the cart/cycle 10 may be converted to the collapsed mode 30 for storage or transport. In this instance, each handlebar 72 is rotated downward upon the fork bracket 60 to extend to either side of the front wheel 66, thus reducing the overall height of the assembly. It is envisioned that other modification intended to reduce the "footprint" of the cart/cycle 10 may also be feasible, but generally the entire unit is compact enough for most storage situations and is adapted to fit on a conventional bicycle vehicle rack for transport.

Many modifications to the above embodiment may be made without altering the nature of the invention. The dimensions and shapes of the components and the construction materials may be modified for particular circumstances or types of bags to be carried.

While various embodiments have been described above, it should be understood that they have been presented by way of example only, and not as limitations.

INDUSTRIAL APPLICABILITY

The rideable pedal/motor golf bag cart/cycle 10 of the present invention is intended for use primarily by golfers who desire physical exercise along with maximum convenience and safety while transporting a golf bag 12 and a rider 13 during a round of golf. The cart/cycle 10 is relatively lightweight and is suitable for transport on ordinary cycle racks. Like any cycle having two wheels, the cart/cycle 10 is does require balancing by the rider 13 when in motion and tip-prevention by the kickstand 50 when not attended. The general symmetry of the cart/cycle 10 about the longitudinal plane 11 substantially aids in keeping the unit balance. The cart/cycle 10 also requires no straps or other fasteners to retain and support the golf bag, thus minimizing the amount of loose or dangling components and reducing effort.

For typical use, the riding golf bag cart/cycle 10 will be in a rest position (collapsed mode 30) with the motor 108 off and the kickstand 50 activated. The rider 13 (or a worker) will then slide the golf bag 12 bottom first to rest against and on the restraints defined by the bag bottom cradle 90, the pair of bag bottom wings 91, and the seat tube 38. The upper portion of the golf bag 12 will rest against the upper bag cradle 92 which will provide vertical support and at least some lateral restraint. The golf bag 12 will be maintained to be centered on the longitudinal plane 11 (balance-centered) to rest at about a optimal thirty degree angle from horizontal such that golf clubs will extend forward and upward over the front wheel 66 for easy access. The rider 13 will adjust the seat 52 on the mounting bracket 56 to the proper height, and mount the cart/cycle 10 to sit upon the seat 52. The legs of the rider 13 will straddle the bottom extent of the golf bag 12 and extend downward to the pedals 96.

In order to move forward, the seated rider 13 may set the control unit 116 via the off control 118 and manually propel the cart/cycle 10 in pedal mode by using the pedals 96. In motor assist mode the motor assist control 120 is utilized to activate the control unit 116 to start the electric motor 108 while continuing the pedal operation and using the throttle control 124 to select the amount of assisted power to be provided to the force manually provided by the rider 13. In motor-only mode the motor-only control 122 is utilized to activate the motor and activate the decoupler 114 and the throttle control 124 is set to control the speed of rotation of the rear wheel 86 to drive the cart/cycle 10 forward at the desired speed. The brake actuators 128 will be activated to use the brake(s) 130 to slow or stop the travel when needed (such as on downslopes or on reaching the destination location). The rider 13 will then dismount, activate the kickstand 50 (or lean the cycle 10 against an object such as a tree or bench), play the next stroke(s) and repeat the process to proceed to the next location.

When the round is over, the golfer simply: dismounts; activates the kickstand 60 (or parks in a designated spot which prevents tipping); and removes the golf bag 12 from the cart 10, rotates the handlebars 72 to the compact mode 30 if desired, and either stores or transports the cart/cycle 10 to a storage location.

The extreme convenience, ease of operation, relative compactness, and light weight of the inventive cart/cycle 10 make it a joy to own and use and a desirable accessory for any golfer who wishes to traverse the course without carrying the weight of the bag. The wide and relatively soft front tire 70 and rear tire 86 minimize disruption of the turf on the course and facilitate access to the areas of the course upon which powered units are permitted.

For the above, and other, reasons, it is expected that the collapsible riding golf bag cart/cycle 10 of the present invention will have widespread industrial applicability. Therefore, it is expected that the commercial utility of the present invention will be extensive and long lasting.

What is claimed is:

1. A pedal powered motor-assisted rideable golf bag cart/cycle, comprising:
    a cycle frame supporting a front wheel, a rear wheel aligned with the front wheel, and a seat for supporting a rider, said cycle frame being substantially symmetrical about a longitudinal plane;
    a steering subassembly including a right handlebar and a left handlebar creating a void therebetween to receive a portion of a golf bag, wherein the right and left handlebars are rotatably coupled to the cycle frame via a steering bracket and can be moved by the rider to turn said front wheel;
    a pedal subassembly installed on said cycle frame for use by the rider, including a drive chain for rotating said rear wheel;
    an electric motor in said rear wheel for providing a motor-assist to rotation of said rear wheel, said electric motor being controlled by a control subassembly operated by the rider; and
    a bag support subassembly on said cycle frame aligned with said longitudinal plane, said bag subassembly being adapted to support the golf bag at an angle between twenty five and forty degrees from horizontal, and positioned so that a portion of the golf bag is (a) between the right handlebar and the left handlebar, which rotate relative to the stationary golf bag, and (b) extends over a portion of the front wheel.

2. The golf bag cart/cycle of claim 1, wherein said bag support subassembly includes;
    a bottom bag cradle situated below said seat and above said pedal subassembly;
    a bag top cradle mounted on said cycle frame between said handlebars with a portion of the bag top cradle located above an elevation of said steering bracket and over a portion of the front wheel, said bag top cradle being stationary with respect to the handlebars and partially surrounding a portion of a perimeter of the golf bag to inhibit lateral movement.

3. The golf bag cart/cycle of claim 2, wherein the bag top cradle mounted on said cycle frame forward of said handlebars.

4. The golf bag cart/cycle of claim 2, wherein:
    said right and left handlebars are individually, and pivotally, coupled to the steering bracket such that they may be rotated downward about said front wheel to a collapsed position.

5. The golf bag cart/cycle of claim 4, wherein
    a pair of fork arms separately attach to the steering bracket and the front wheel.

6. The golf bag cart/cycle of claim 5, wherein
    said right and left handlebars rotate forward and away from the seat and cycle frame to the collapsed position whereby at least a portion of the right and left handlebars are substantially parallel with a portion of the pair of fork arms; and
    the horizontal angle of incline from said bottom bag cradle to said top bag cradle is in the range of twenty five to forty five degrees.

7. The golf bag cart/cycle of claim 6, wherein
    the right handlebar includes a right curved tube section, the left handlebar includes a left curved tube section; and
    a separation distance between the right handlebar and the left handlebar varies and the right curved tube section and the left curved tube section increase the separation distance from a first separation distance adjacent the steering bracket to a second separation distance that is greater than the first separation distance.

8. The golf bag cart/cycle of claim 6, wherein
the right handlebar includes a right handle grip, the left handlebar includes a left handle grip;
in the collapsed position the right and left handlebars are between the pair of fork arms and the seat, and the right and left handle grips are oriented toward the rear wheel;
said golf bag is straddled by the rider during operation.

9. A single passenger pedal powered golf bag cart/cycle comprising;
a cycle frame having a front wheel, a rear wheel aligned with the front wheel, a seat for a rider, and handlebars for steering including a right handlebar and a left handlebar creating a void therebetween to receive a portion of a golf bag, wherein the right and left handlebars are rotatably coupled to the cycle frame via a steering bracket coupled to a pair of fork arms connected to the front wheel, and right and left handlebars are individually, and pivotally, coupled to the steering bracket such that they may be rotated forward and away from the seat and cycle frame to a collapsed position;
a lower bag cradle and an upper bag cradle mounted on said frame to support the golf bag at an angle of twenty-five to forty five degrees from the horizontal and positioned so that a portion of the golf bag is (a) between the right handlebar and the left handlebar, which rotate relative to the stationary golf bag, and (b) extends over a portion of the front wheel, and a portion of the upper bag cradle is over a portion of the front wheel, with said golf bag being straddled by the rider; and
a pedal subassembly including a pair of opposing pedals which the rider can utilize to propel said rear wheel to move the cart/cycle forward.

10. The single passenger pedal powered golf bag cart/cycle of claim 9, wherein in the collapsed position the right and left handlebars are rotated such that at least a portion of the right and left handlebars are substantially parallel with a portion of the pair of fork arms.

11. The single passenger golf bag cart/cycle of claim 10, wherein the right handlebar includes a right handle grip, the left handlebar includes a left handle grip, and in the collapsed position the right and left handlebars are between the pair of fork arms and the seat, and the right and left handle grips are oriented toward the rear wheel.

12. The single passenger golf bag cart/cycle of claim 10, wherein:
the right handlebar includes a right curved tube section, the left handlebar includes a left curved tube section; and
a separation distance between the right handlebar and the left handlebar varies and the right curved tube section and the left curved tube section increase the separation distance from a first separation distance adjacent the steering bracket to a second separation distance that is greater than the first separation distance.

13. The single passenger pedal powered golf bag cart/cycle of claim 9, further including a motor for driving said rear wheel, wherein:
said pedal subassembly and said motor may be operated together to provide a power assist to the pedal subassembly, and either one may be operated separately.

14. The single passenger pedal powered golf bag cart/cycle of claim 13, wherein
said pedal subassembly includes a chain drive with a decoupler in order that the said motor can solely provide drive power, without exertion by the rider.

15. A single passenger golf bag cart/cycle comprising:
a cycle frame supporting a rider and a golf bag and having a front wheel and a rear wheel aligned with the front wheel, and a seat and steering subassembly for the rider;
a lower bag cradle and an upper bag cradle, stationary with respect to said steering subassembly, for supporting a golf bag at an angle of twenty-five to forty-five degrees from the horizontal and between the legs of the rider; wherein:
the steering subassembly includes a right handlebar and a left handlebar creating a void therebetween to receive a portion of the golf bag such that a portion of the golf bag is (a) between the right handlebar and the left handlebar, which rotate relative to the stationary golf bag, and (b) extends over a portion of the front wheel;
the right and left handlebars are rotatably coupled to the cycle frame via a steering bracket coupled to a pair of fork arms connected to the front wheel;
the right handlebar includes a right curved tube section, the left handlebar includes a left curved tube section, a separation distance between the right handlebar and the left handlebar varies and the right curved tube section and the left curved tube section increase the separation distance from a first separation distance adjacent the steering bracket to a second separation distance that is greater than the first separation distance;
a highest point on the upper bag cradle is at an elevation above the steering bracket and below a highest point on the right and left handlebars, and a portion of the upper bag cradle is over a portion of the front wheel.

16. The single passenger golf bag cart/cycle of claim 15, wherein the steering bracket is coupled to a pair of fork arms connected to the front wheel, and right and left handlebars are individually, and pivotally, coupled to the steering bracket such that they may be rotated forward and away from the seat and cycle frame to a collapsed position, and further comprising:
a pedal subassembly for the rider to propel the cart/cycle, rider, and rider around a golf course.

17. The single passenger golf bag cart/cycle of claim 16, wherein
at least a portion of the right and left handlebars are substantially parallel with a portion of the pair of fork arms in the collapsed position.

18. The single passenger golf bag cart/cycle of claim 17, wherein the right handlebar includes a right handle grip, the left handlebar includes a left handle grip, and in the collapsed position the right and left handlebars are between the pair of fork arms and the seat, and the right and left handle grips are oriented toward the rear wheel.

19. The single passenger golf bag cart/cycle of claim 15, wherein the steering bracket is coupled to a pair of fork arms connected to the front wheel, and right and left handlebars are individually, and pivotally, coupled to the steering bracket such that they may be rotated forward and away from the seat and cycle frame to a collapsed position, and further comprising:
a motor-assist subassembly for propelling the cart/cycle, rider, and rider around a golf course.

20. The single passenger golf bag cart/cycle of claim 15 and further comprising:
   a pedal subassembly for the rider to propel the cart/cycle, rider, and rider around a golf course, and
   a motor-assist subassembly for propelling the cart/cycle, rider, and rider around a golf course, wherein
said pedal subassembly and said motor subassembly may be operated together or each may be operated separately.

* * * * *